No. 893,170. PATENTED JULY 14, 1908.
L. HUSER.
HOSE CLAMP.
APPLICATION FILED JUNE 14, 1907.
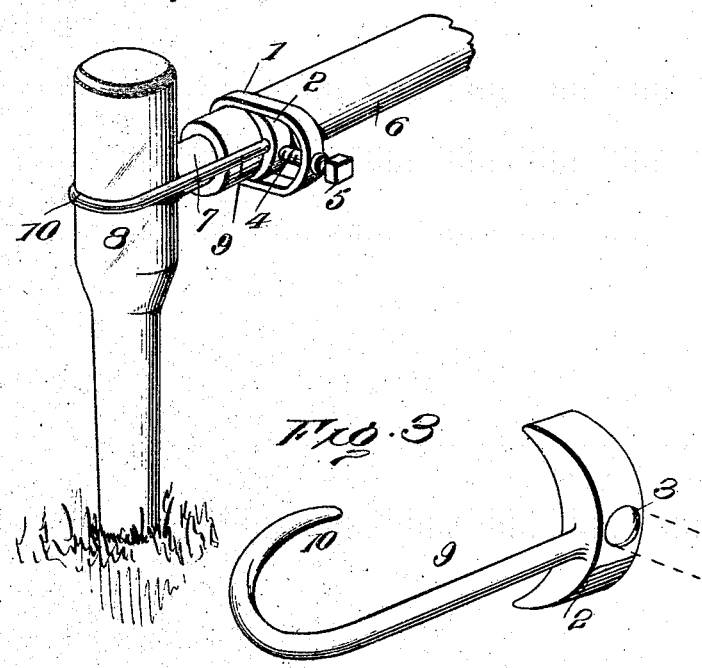
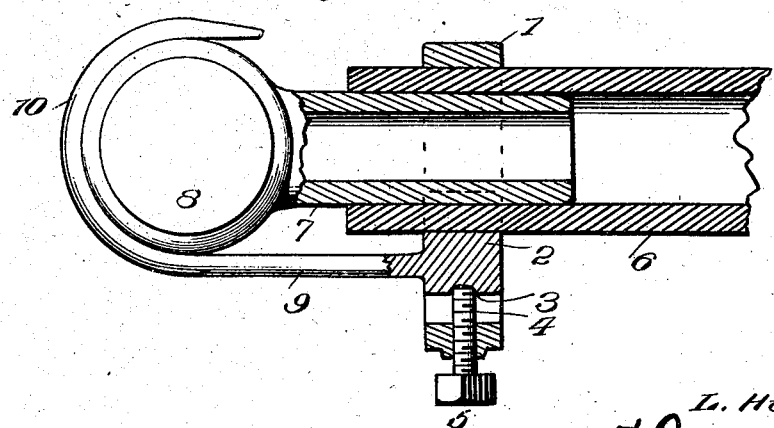

UNITED STATES PATENT OFFICE.

LOUIS HUSER, OF JACK WADE, DISTRICT OF ALASKA.

HOSE-CLAMP.

No. 893,170.　　　　Specification of Letters Patent.　　　Patented July 14, 1908.

Application filed June 14, 1907. Serial No. 379,071.

*To all whom it may concern:*

Be it known that I, LOUIS HUSER, citizen of the United States, residing at Jack Wade, Alaska, have invented certain new and useful Improvements in Hose-Clamps, of which the following is a specification.

In mining operations it frequently becomes necessary to drive a steam point into the ground for the purpose of thawing frozen gravel, steam being applied to the steam point through the medium of hose clamped to a nipple projecting laterally from the point, and under such conditions considerable annoyance is frequently occasioned owing to the fact that the pressure of the steam and the hammering upon the steam point causes the hose to pull away from the nipple.

The object of the present invention has been to overcome these and similar difficulties by the provision of a hose clamp which is provided with an arm designed to engage with a pipe arranged at angles to the hose and thereby prevent the latter from slipping longitudinally.

For a full description of the invention and the merits thereof and also to acquire a knowledge of the details of construction and the means for effecting the result, reference is to be had to the following description and accompanying drawings, in which:

Figure 1 is a perspective view showing the application of the improved hose clamp. Fig. 2 is a longitudinal sectional view through the device. Fig. 3 is a detail view of the clamping block and hook member carried thereby.

Corresponding and like parts are referred to in the following description and indicated in all the views of the drawings by the same reference characters.

The clamp shown in the drawings comprises the body or stock 1 which is in the nature of an elongated collar receiving the hose, and a clamp block 2 arranged within the stock 1 and having an approximately crescent shape, the concave side bearing against the hose, while the convex side is formed with a socket 3 receiving the extremity of a clamping bolt 4 threaded in one end of the collar 1. With this construction it will be readily apparent that by engaging the angular head 5 of the clamp nut 4 and turning the latter in the required direction the block 2 can be moved within the collar 1 in such a manner as to either clamp the hose or release the same. In the present instance the hose clamp is shown as employed to fasten the end of a piece of hose 6 to the nipple or branch tube 7 projecting laterally from the steam point or main pipe 8.

For the purpose of preventing the hose from slipping away from the nipple owing to the pressure of the steam and the driving of the point, the clamping block 2 is provided with an arm 9 which projects laterally therefrom and is disposed at substantially right angles to the plane of the stock 1. The extremity of this arm is hooked as indicated at 10 and is designed to engage the steam point 8 or other analogous member arranged at right angles to the hose.

Having thus described the invention, what is claimed as new is:

The combination of a main pipe provided with a laterally projecting branch tube, a piece of hose applied to said branch tube, and a clamp for securing the hose in position, the said clamp comprising an elongated collar for receiving the hose, a crescent shaped clamping block arranged loosely within one end of the collar and engaging the hose, a clamping bolt threaded in one end of the collar and engaging the clamping block, and a curved member projecting laterally from the clamping block and disposed at right angles to the plane of the elongated collar and embracing the main pipe in the manner specified.

In testimony whereof I affix my signature in presence of two witnesses.

LOUIS HUSER. [L. S.]

Witnesses:
　OPHELIA DEVINE,
　CHAS. E. M. COLE.